US012351217B2

(12) United States Patent
Haas

(10) Patent No.: US 12,351,217 B2
(45) Date of Patent: Jul. 8, 2025

(54) VEHICLE SYSTEM WITH SECOND POWER SOURCE

(71) Applicant: Transportation IP Holdings, LLC, Norwalk, CT (US)

(72) Inventor: Carl L. Haas, Walkersville, MD (US)

(73) Assignee: Transportation IP Holdings, LLC, Norwalk, CT (US)

( * ) Notice: Subject to any disclaimer, the term of this patent is extended or adjusted under 35 U.S.C. 154(b) by 899 days.

(21) Appl. No.: 17/507,681

(22) Filed: Oct. 21, 2021

(65) Prior Publication Data

US 2023/0129585 A1 Apr. 27, 2023

(51) Int. Cl.
*B61L 15/00* (2006.01)
*B60L 3/00* (2019.01)

(52) U.S. Cl.
CPC ......... *B61L 15/0018* (2013.01); *B60L 3/0092* (2013.01); *B61L 15/0036* (2013.01); *B61L 15/0054* (2013.01); *B61L 15/0063* (2013.01); *B61L 15/0081* (2013.01); *B60L 2200/26* (2013.01); *B61L 15/0027* (2013.01); *B61L 2205/00* (2013.01)

(58) Field of Classification Search
CPC ............. B61L 15/0018; B61L 15/0054; B61L 15/0081; B61L 2205/00; B61L 15/0063; B61L 23/34; B61L 15/0036; B61L 15/0027; G08G 1/22; B60L 3/0092; B60L 2200/26; B61C 17/12
See application file for complete search history.

(56) References Cited

U.S. PATENT DOCUMENTS

| | | | |
|---|---|---|---|
| 6,225,919 B1* | 5/2001 | Lumbis | B61L 15/0081 701/19 |
| 2014/0129061 A1* | 5/2014 | Cooper | H04L 63/00 701/19 |
| 2021/0053594 A1* | 2/2021 | Raeder | B61C 17/12 |
| 2021/0249895 A1* | 8/2021 | Terada | H02J 7/0068 |
| 2022/0041059 A1* | 2/2022 | Nakayama | B60L 3/04 |

* cited by examiner

*Primary Examiner* — Zachary L Kuhfuss
(74) *Attorney, Agent, or Firm* — K&L Gates LLP

(57) ABSTRACT

A system may be provided that includes a first power source configured to supply power to a communication system of a vehicle system to communicate a signal from a first vehicle of the vehicle system to a second vehicle of the vehicle system. The system may include a second power source configured to supply power to the communication system to communicate the signal from the first vehicle to the second vehicle, and a controller. The controller may obtain an operational parameter, and communicate the signal based on the operational parameter when the first power source supplies power to the communication system. The controller may be configured to communicate the signal utilizing the power from the second power source based on the operational parameter when the first power source does not supply power to the communication system.

20 Claims, 3 Drawing Sheets

VEHICLE SYSTEM WITH SECOND POWER SOURCE

BACKGROUND

Technical Field

The subject matter described herein relates to vehicle systems that utilize a second power source to communicate emergency signals.

Description of the Art

Certain vehicle systems include numerous vehicles that operate together to move to and from different locations. These vehicle systems can include fleets of automobiles, fleets of airplanes, rail vehicles, fleets of aquatic vehicles, etc. As a result of numerous vehicles operating together, communication between different vehicles often is required or advantageous to facilitate coordinated movements, turning, braking, or the like.

In one example, rail vehicle systems can include a head of train (HOT) vehicle that includes a first controller (e.g. HOT device) that communicates with other vehicles within the rail vehicle system, including an end of train (EOT) vehicle that has an EOT device. The HOT vehicle is typically the first vehicle of the vehicle system, while the EOT vehicle is typically the last vehicle of the vehicle system. Still, the HOT device and/or EOT device may be located at different locations of the rail vehicle system. The communication between the HOT and EOT vehicles can include directions for movement, braking, change of direction, emergency situations, etc. For example, if a runaway rail vehicle situation occurs because a kink, or other damage, occurs in the brake pipe, the HOT vehicle can communicate with the EOT vehicle such that the EOT vehicle can apply an emergency brake to stop the rail vehicle, even though the brake pipe is damaged and not functional.

Despite the rail vehicle having the emergency protocol of detecting a malfunctioning system, such as a braking system, at the HOT and providing communication to the EOT to provide emergency braking, difficulties remain. For example, on occasion, an accident, including hitting an animal crossing the tracks, severe weather, etc. can result in the power supplied to a communication system between the HOT and EOT being damaged, malfunctioning, or not operational. Without power, and a corresponding communication path between the HOT and EOT, there may be no way for communication to be provided between the HOT and EOT vehicles themselves if an operational condition, such as a runaway vehicle system requiring emergency braking by the EOT vehicle, occurs. Instead, a different communication path such as a cell phone or otherwise would need to be utilized. However, if a vehicle operator does not have an alternative communication path, or if the rail vehicle is an autonomous vehicle that does not have an operator, alternative communication paths between the HOT and the EOT may be lacking. It may be desirable to have a system and method that differs from those that are currently available.

BRIEF DESCRIPTION

In accordance with one embodiment, a system is provided that includes a first power source that can supply power to a communication system of a vehicle system to communicate a signal from a first vehicle of the vehicle system to a second vehicle of the vehicle system. The system may include a second power source configured to supply power to the communication system to communicate the signal from the first vehicle to the second vehicle, and a controller. The controller includes one or more processors that may obtain an operational parameter, and communicate the signal based on the operational parameter when the first power source supplies power to the communication system. The one or more processors may communicate the signal utilizing the power from the second power source based on the operational parameter when the first power source does not supply power to the communication system.

In accordance with one embodiment, a system is provided that may include a vehicle system having a first power source and a second power source. The second power source may supply power to communicate a signal from a first vehicle of the vehicle system to a second vehicle of the vehicle system. The system may include a sensor coupled to an operating system of the vehicle system and that may obtain an operational parameter related to the operation of the vehicle system. The system may include a controller. The controller may include one or more processors that may obtain the operational parameter from the sensor, determine an operating condition of the first power source, and communicate the signal utilizing the power from the second power source based on the operational parameter and the operating condition of the first power source.

In accordance with one embodiment, a system is provided that may include a vehicle system having a first power source, and a second power source. The system may include a sensor that can be coupled to the first power source to receive power for operation, and coupled to the second power source to receive power for operation. The sensor may be coupled to a braking system to obtain an operational parameter related to the braking system. The system may have a controller. The controller may include one or more processors that may determine the first power source is unable to provide power for operation to the sensor, and operate the sensor with the power from the second power source in response to determining the first power source is unable to provide power for operation to the sensor.

BRIEF DESCRIPTION OF THE DRAWINGS

The inventive subject matter may be understood from reading the following description of non-limiting embodiments, with reference to the attached drawings, wherein below.

DETAILED DESCRIPTION

The subject matter described herein relates to a vehicle system that includes a first power source and a second power source at a first location, or first vehicle of the vehicle system, to ensure signals (e.g., an emergency signal or another signal) can be communicated to a different, second location, or second vehicle of the vehicle system even with the loss of the first power source.

While one or more embodiments of the inventive subject matter described herein relate to the communication of signals between a head or leading end of the vehicle system and the end or trailing (rear) end of the vehicle system, not all embodiments of the inventive subject matter are limited in this way. Instead, at least one embodiment relates to the communication of signals between different locations in the vehicle system (e.g., different vehicles in the same convoy, consist, or another vehicle system). By adding the ability for the first vehicle of the vehicle system to sense an emergency, such as a pneumatic emergency, the first vehicle of the vehicle system can automatically communicate the emergency signal when an emergency is sensed at the first vehicle of the vehicle system with or without an accompanying loss of the first power source. So, in an example of a rail vehicle system, if an accident causes an issue with the pneumatic brake line, the head of the rail vehicle system can still communicate with the end of the rail vehicle system to manually apply the brakes because of the emergency.

Figure 1:
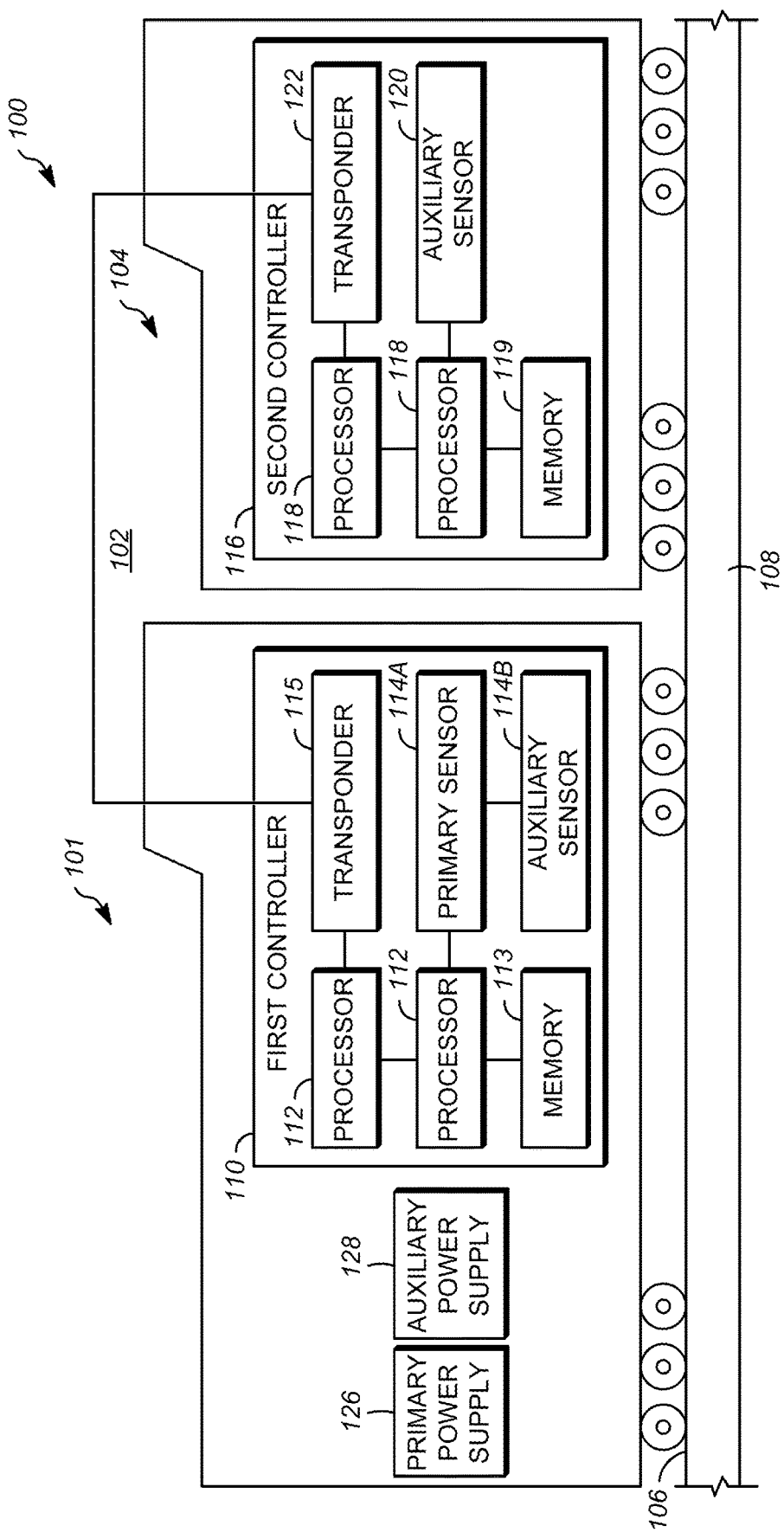
FIG. 1 is a schematic view of a vehicle system.

FIG. 1 illustrates an example vehicle system 100 that includes a first vehicle 101 in an environment 102 with a second vehicle 104 that each travel along one or more routes 106. In one example, the first vehicle and second vehicle may be rail vehicles where the one or more routes include a track 108. In other embodiments, the first vehicle and/or second vehicle may be another type of vehicle, such as automobiles, trucks, buses, marine vessels, aircraft (manned or unmanned), mining vehicles, agricultural vehicles, off-highway vehicles (OHV). An OHV includes a vehicle system that is not legally permitted and/or designed for travel on public roadways. Suitable vehicles may be manually operated, semi-autonomous, or autonomous vehicle. In one embodiment, the vehicle may be an autonomous rail vehicle. In particular, the route may support non-rail vehicle applications as non-rail vehicles travel on a road or route, as well as rail vehicle applications for rail vehicles that may move on a track.

The vehicles may be mechanically coupled with each other, such as by couplers. Alternatively, the vehicles in a vehicle system may not be mechanically coupled with each other, but may be logically coupled with each other, virtually coupled with each other, or the like. For example, the vehicles may be logically coupled and/or virtually coupled with each other by the vehicles communicating with each other via wireless networks. Suitable networks may use cellular communications, Wi-Fi communications, radio frequency communications. Networked vehicle systems may coordinate the movements of the vehicles with each other so that the vehicles travel together in a convoy, consist, platoon, swarm, or like group as the vehicle system.

The first vehicle includes a first controller 110 that has one or more processors 112. Each processor may include a microprocessor or equivalent control circuitry. At least one algorithm may operate within the one or more processors. A memory 113 may be communicatively coupled to the one or more processors. The memory may be an electronic, computer-readable storage device or medium. The controller memory may be housed in the housing of the controller, or alternatively may be on a separate device that may be communicatively coupled to the controller and the one or more processors therein. By "communicatively coupled," it is meant that two devices, systems, subsystems, assemblies, modules, components, and the like, are joined by one or more wired or wireless communication links, such as by one or more conductive (e.g., copper) wires, cables, or buses; wireless networks; fiber optic cables, and the like.

A first sensor 114A and second sensor 114B may be coupled to the one or more processors. The first sensor and second sensor may be associated with the first vehicle, the second vehicle, another vehicle in the vehicle system, with an operating system of the vehicle system, or the like. Operating systems may include braking systems, engine systems, power source systems, communication systems, wheel systems, etc. The sensors may generate, obtain, signal or provide one or more operational parameters of the vehicle system. Suitable sensors may include a pressure sensor, pneumatic sensor, temperature sensor, hydraulic sensor, optic sensor, accelerometer or vibration sensor, haptic sensor, or the like. In one example, the first sensor may be associated with a braking system of the vehicle system such that the operational parameter may be a pneumatic parameter that is related to the braking system. In another example, the first sensor may be an accelerometer associated with a wheel such that the operational parameter is a vibration parameter that is related to the wheel or suspension of the vehicle.

Obtaining the operational parameter may include detecting a signal. In one example, an input from an operator can include a request to send the emergency signal that may be, or may include, an operational parameter. Receiving the manual input may be considered obtaining the operational parameter rather than receiving a signal in from a sensor. In addition, the input may be from a sensor, such as a pressure sensor powered by controller or device that is not the first controller or second controller. In another example, the input may be from a device that detects the opening or closing of a switch. A suitable switch may be a pressure switch, or a proximity switch, or the like. In another example, the input may be from an accelerometer, or other device. These may include haptic or vibration sensors. These sensors may detect a collision has occurred, for example. Alternatively, the input may be the actuation of a button, switch, key, or the like actuated by an operator. In yet another example, the input may be as a result of loss of communications from other devices. In another example, the input may be from another system, such as an autonomous control system requesting a braking application be applied.

In one embodiment, the first sensor may detect operational parameters such as fluid pressure of a brake line, temperature of a wheel, bearing, axle, etc. The first sensors may include pressure sensors, pressure switches, sensors that detect when a pressure switch is opened or closed, temperature sensors, haptic sensors, fluid level sensors, or the like. These operational parameters may be utilized to determine if the braking system along the entire length of a vehicle system is operational, or if emergency braking is required. The second sensors meanwhile can be haptic sensors, pressure sensors, vibration sensors, temperature sensors, accelerometers, or like. In one example, the second sensors provide data and information related to whether the vehicle system has had an accident, whether the first power source is operational, whether a communication system is not in operation, etc. In this manner, the second sensors may provide data and information related to different operating systems of the vehicle system, the environment of the vehicle system, or the like.

The first controller may include a communication unit 115 for receiving and/or broadcasting signals via wired and/or wireless pathways. The communication unit may be in the form of a separate receiver and broadcasting device, have only a receiver or broadcasting device, or may be one unit. The communication pathway may accommodate, for example, Wi-Fi communication, cellular communication, very-high frequency (VHF) communication (e.g. in a range between 3 megahertz (MHz) and 300 MHz), ultra-high frequency (UHF) communication (e.g. in a range between 300 MHz and 3 gigahertz (GHz)), local area networks (LANs), wireless local area networks (WLANs), or the like.

The second vehicle may include a second controller 116 that has one or more processors 118. Optionally, the one or more processors may be coupled to a memory 119, one or more second sensors 120 associated with the second vehicle, and may include a communication unit 122 similar to the communication unit of the first vehicle. The communication unit may provide a communication pathway to the communication unit of the first vehicle in any of the manners previously described.

The first vehicle may include a first power source 126 that may be disposed in the first vehicle. The first power source may be a battery, diesel engine, gas engine, hybrid engine, hydraulic engine, pneumatic engine, etc. The first power source provides power to operating systems of the vehicle system. The operating systems can include the propulsion system, communication system, electrical systems of individual vehicles of the vehicle system, air conditioning system(s), braking systems, the first sensor, the second sensors, or the like. In one example, the first power source provides power to at least the communication system and a braking system sensor.

The first vehicle may include a second power source 128 that may be disposed in the first vehicle. In one example, the second power source may be coupled to the first power source. To this end, in one example the first power source may be a battery, and the second power source may be a capacitor, super capacitor, battery, etc. A super capacitor as used herein refers to a capacitor that stores ten to one-hundred times more energy per unit volume or mass than an electrolytic capacitor that is often utilized in association with a hybrid engine. In this manner, in one example, the first power source may share power with the second power source. By having the second power source be a capacitor, super capacitor, or a battery, each that hold a charge, even if the first power source is damaged, unable to provide power, unable to be used, or the like, the second power source is still able to provide power. To this end, second power source may provide power to at least the communication system and a braking system sensor.

Optionally, the first power source and second power source may share, or be within the same housing. Alternatively, the second power source may be separated and spaced from the first power source. In another example, the first power source and second power source are not coupled to one another, including not electrically coupled to one another. In particular, the second power source may be in a different location at the front of the vehicle system and include a protective housing that may be different from a housing of the first power source. In this manner, if an accident occurs to the first vehicle, including as a result of hitting an object, the second power source and the first power source are unlikely to both be damaged and not operational.

The second power source in one example may provide power to fewer operating systems than the first power source. In another example, the second power source provides power to as many operating systems as the first power source. In one example, the second power source only provides power to the communication system, and a first sensor in the braking system. The second power source operates as a backup power source to the first second power source to ensure that even when the first power source is not operating, power can be supplied to the communication system and first sensor. As a result, communications regarding emergency braking can still be provided from the first vehicle to the second vehicle.

Figure 2:
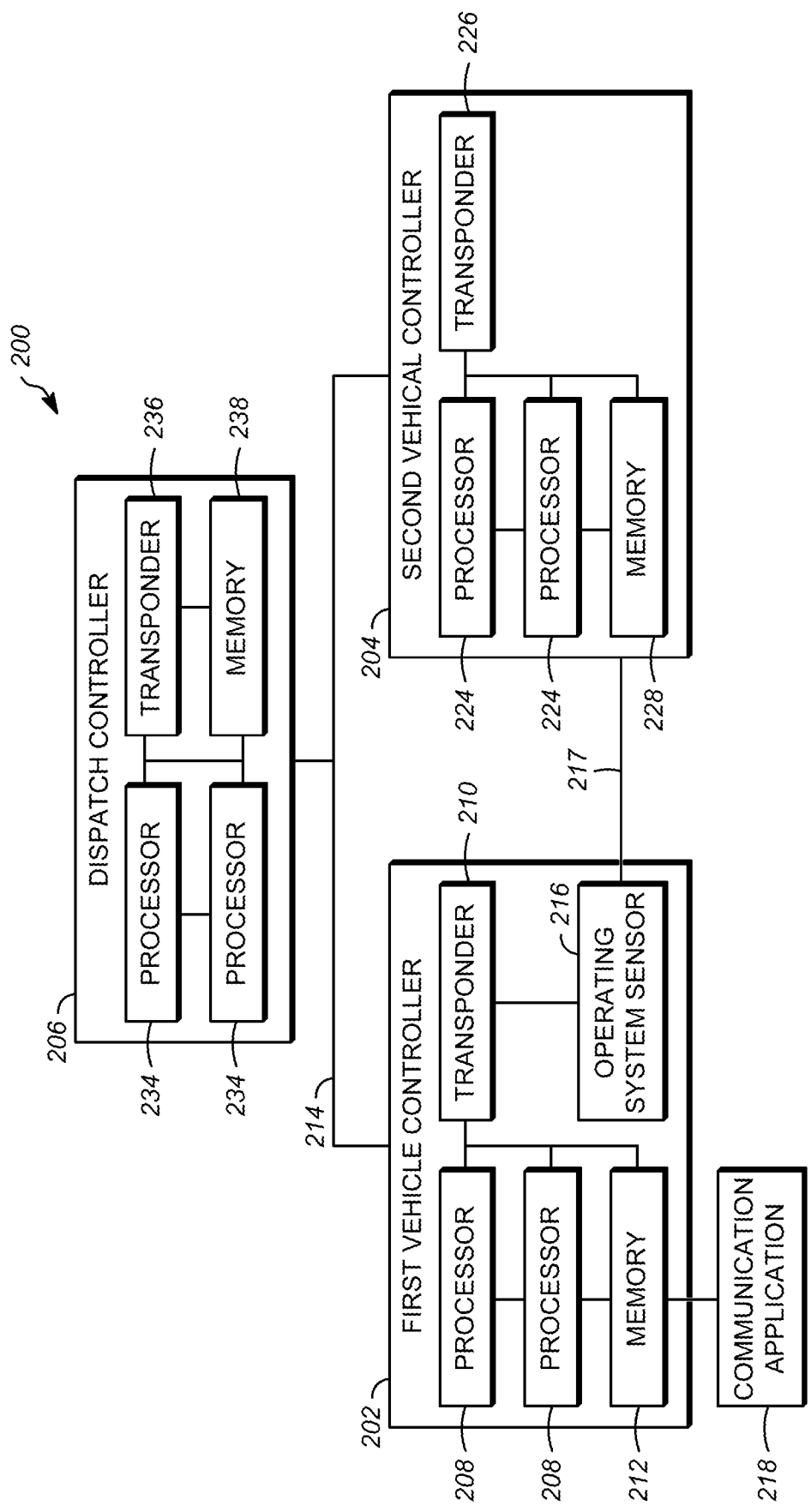
FIG. 2 is a schematic view of a control system of a vehicle system.

FIG. 2 illustrates a control system 200 that may be used by a vehicle system. In one example, the vehicle system may be the vehicle system of FIG. 1. The control system includes a first vehicle controller 202, a second vehicle controller 204, and a dispatch controller 206. The first vehicle controller and second vehicle controller may be controllers for one or more automobiles, marine vessels, aircraft, mining vehicles, agricultural vehicles, off-highway vehicles (OHV) system (e.g., a vehicle system that is not legally permitted and/or designed for travel on public roadways), or the like.

The first vehicle controller may include one or more processors 208, a communication unit 210, and memory 212, as described above. The one or more processors may perform the processes and methods described herein. In one example, the one or more processors may execute instructions stored in the memory. The instructions may be provided by a program, application, etc. stored in the memory. The communication unit 210 in example embodiments may include a transmitter, receiver, combination thereof, etc. The communication unit 210 may form a communication pathway 214 through which a communication signal, including an emergency signal may be communicated. The communication pathway may span between the first vehicle and the second vehicle, the first vehicle and a remote vehicle, the first vehicle and a remote communication device, a combination thereof, or the like. In this manner, the emergency signal can be communicated to the second vehicle, a remote location, etc. to inform individuals of an emergency determined by the one or more processors.

The one or more processors may be electrically coupled to, and be in communication with, operating system sensors 216. Suitable operating system sensors may include braking sensors, engine sensors, power source sensors, communication sensors wheel sensors, pressure sensors, pneumatic sensors, temperature sensors, hydraulic sensor, haptic sensors, or the like. In one example, the operating sensor is a pneumatic sensor associated with a brake line 217 that is responsible for braking the vehicle system. In addition, the memory may include a communication application 218 that provides instructions for providing communications and powering communication devices that provide the communication. To this end, a first communication device may be powered by a first power source, while a second communication device may be powered by a second power source. The operating sensors may provide signals, data, information, etc. that may be utilized by the one or more processors to determine when communication from a first vehicle to a second vehicle needs to occur, and whether a communication device is not receiving power from first power source. The communication device may not be receiving power from the first power source as a result of a collision, damage, malfunctioning, loss of fuel or energy, etc., resulting in the need for the second power source to provide the power for the communication device.

The second vehicle controller may include one or more processors 224, a communication unit 226, and memory 228. In this manner, the second vehicle controller can communicate with operating systems, communicate signals, data, information, etc. In this manner, the one or more processors of the second vehicle controller may determine whether communications signals desired to be passed from the first vehicle controller to the second vehicle controller are being received at the second vehicle controller. When the signals are not be received at the second vehicle controller, an indication may be provided that the first vehicle controller is not receiving power, is malfunctioning, etc. In this manner, the one or more processors of the second vehicle controller can ensure the second power source may be supplying power to the communication system to provide the communication.

Figure 3:
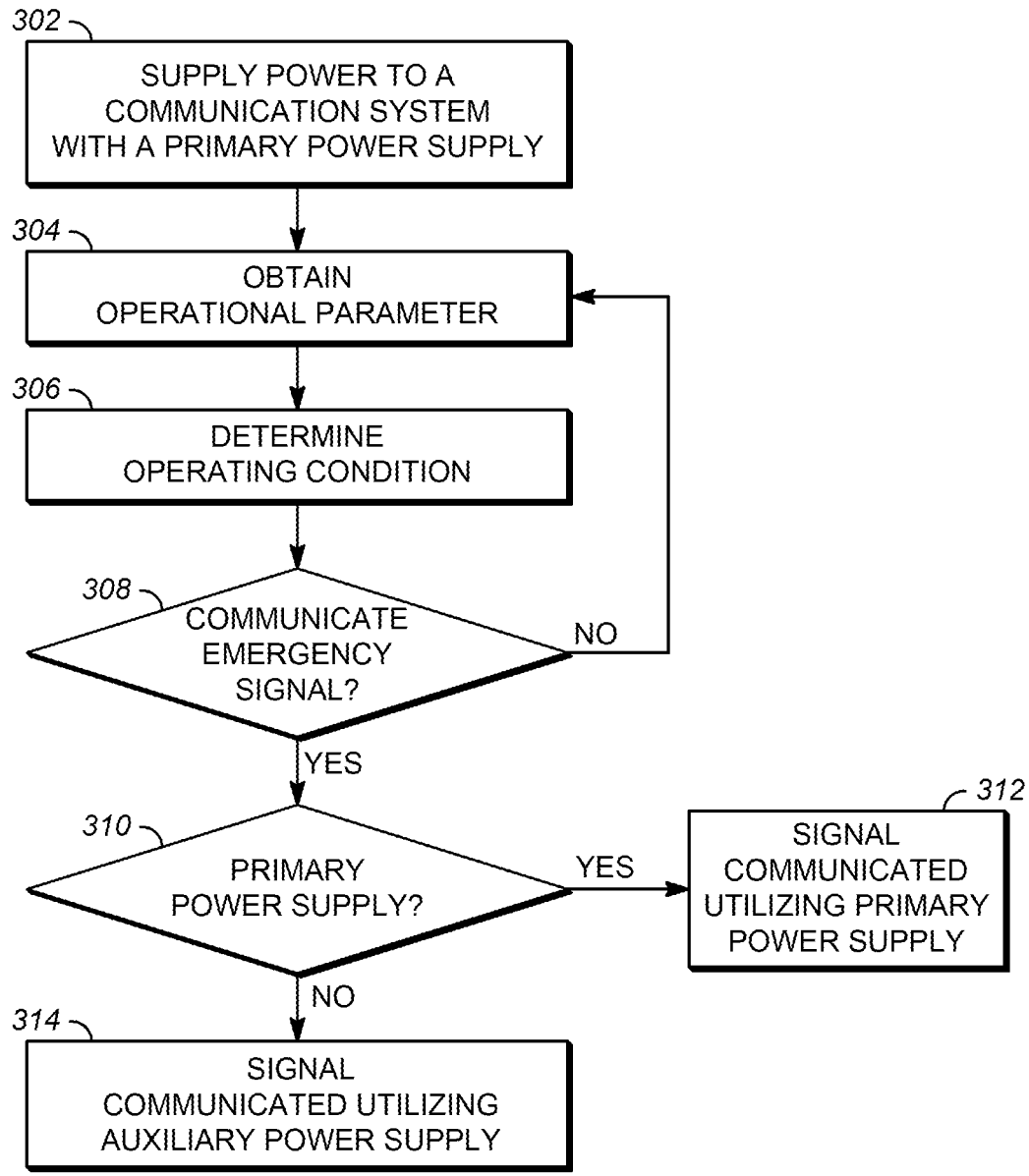
FIG. 3 is a block flow diagram of a method of providing a signal for a vehicle system.

FIG. 3 illustrates a method 300 for communicating signals for a vehicle system. The vehicle system is one example may be the vehicle system of FIG. 1. In another example, the control system of FIG. 2 implements the method of FIG. 3. In various embodiments, a suitable vehicle system can include plural vehicles, and can be a rail vehicle, a fleet, including an air fleet, water fleet, or ground fleet, or the like.

At step 302, a first power source supplies power to a communication system to communicate a signal from a first vehicle to a second vehicle. In one example the first power source may be an engine, battery, hybrid engine, pneumatic engine, hydraulic engine, etc. In another example, the first vehicle may be a head of train of the vehicle system where an operator operates the vehicle system. Meanwhile, the second vehicle may be an end of train of the vehicle system that may control braking of the vehicle system, including configured to provide emergency braking should any part of a brake line from the head of vehicle to the end of vehicle malfunction, become damaged, etc. In some example embodiments the head of train vehicle may be a lead vehicle, while in other examples the head of train vehicle is not a lead vehicle, but instead a middle vehicle of numerous vehicles. Similarly, the end of train vehicle in one example may be the last, or final vehicle of a vehicle system, whereas in other examples the end of train vehicle is not the last or final vehicle of the vehicle system, and instead is a middle vehicle of the vehicle system. In particular, in example vehicle systems the communication system may be provided so that when a malfunction, operating condition, or otherwise related to the braking system may be determined at the first vehicle, a communication can be provided to the second vehicle to apply the emergency brake accordingly.

At step 304, an operational parameter may be obtained from a sensor. In one example the sensor may be a braking system sensor related to braking of the vehicle system, and the operational parameter may be a pneumatic parameter. In particular, the pneumatic parameter may be a designated criteria. The sensor may be a pressure sensor, temperature sensor, hydraulic sensor, haptic sensor, or the like. The sensor in one example provides a signal to one or more processors of a remote device that determine the operational parameter. In one example, the sensor is powered by the second power source. The operational parameter may then be communicated from the one or more processors of the remote device to the one or more processors of the first vehicle controller or second vehicle controller. The remote device may be on the vehicle system. In particular, the term remote is utilized to indicate that the controller is not the controller sending or receiving the communication. For example, in one example, an ethernet port may be connected to the braking system, where the ethernet port is utilized to communicate the operational parameter, or data utilized to determine the operational parameter to a first vehicle controller or second vehicle controller. The operational parameter can be a pressure, temperature, fluid level, etc. In particular, the operational parameter may be utilized in determining if an operating condition is presented.

To this end, at step 306, a determination of an operating condition based on the operational parameter may be made. The operating condition can be the exceeding of a pressure level or threshold, the exceeding of a temperature level or threshold, the change in a fluid level over time, the change in pressure over time, the change in temperature over time, a determination that a signal may be being received, or the like. In one example, the operating condition, may be a determination that a braking system is malfunctioning. The determination may be made based on any of the example determinations described herein. In another example, a determination may be made wherein a sensor signal meets one or more designated criteria. The sensor signal may provide the operational parameter, or be utilized to determine the operational parameter. Based on one or more designated criteria, and indication is provided that an operating condition is present. The designated criteria may include pressure drop, a pressure threshold, a temperature drop, a temperature threshold, or the like. In one example, the braking pressure drops below a pressure threshold, the designated threshold is met.

At step 308, a determination may be made to communicate a signal from the first vehicle to the second vehicle based on the operating condition. In one example, the operating condition indicates that emergency braking may be required for the vehicle system at the second vehicle because braking by the first vehicle is not occurring. In one example, a brake line has been interrupted, damaged, or otherwise, resulting in the operating condition indicating the interruption, damage, etc. If a signal does not need to be communicated, operational parameters continue to be obtained for determining the operating condition.

At step 310, a determination may be made whether the communication system may be able to communicate the signal utilizing power supplied by the first power source. In one example, the first power source may be damaged, out of power, malfunctioning, etc. As a result, the communication system may be unable to communicate the signal utilizing power supplied by the first power source. If at step 310, a determination may be made that the communication system may be receiving sufficient power from the first power source, then at step 312, the communication system communicates the signal from the first vehicle to the second vehicle. Therefore, in an example when a brake system may be malfunctioning, a signal may be communicated to an end of vehicle of a vehicle system so that the emergency brakes may be applied.

If at step 310, a determination may be made that the communication system may be unable to communicate a signal using power from the first power source, then at step 314, the communication system communicates the signal using power from a second power source. The second power source in example embodiments may be one of a capacitor, super capacitor, battery, or the like. The second power source may receive power from the first power source while the first power source may be operating so that if the first power source stops supplying power to the communication system, the second power source may continue to supply the power accordingly. In one example, a determination is made that a determined event has occurred, and the controller responds by switching modes to communicate the signal from the first communication system to the second communication system. A determined event may be any event, action, occurrence, etc. that results in the need to utilize the second communication system instead of the first communication system. In example embodiments, the first power source may stop supplying power, or unable to supply power because of an accident, impact, malfunctioning of power source components, exhaustion of fuel, exhaustion of battery life, etc. Still, because the second power source is provided, power continues to be supplied to the communication system to allow a signal to be communicated. To this end, by supplying the power from the second power source at step 314, at step 312 the signal is still communicated, even when the first power source is no longer able to supply power to the communication system. Consequently, the signal is still communicated, allowing for the second vehicle to take remedial action, such as applying an emergency brake, accordingly. In another example, the health condition of the first power source, and/or second power source may be monitored to make the determination regarding which may be utilized to communicate the signal.

In some example embodiments, a system may be provided that includes a first power source that may supply power to a communication system of a vehicle system to communicate a signal from a first vehicle of the vehicle system to a second vehicle of the vehicle system. The system may include a second power source that may supply power to the communication system to communicate the signal from the first vehicle to the second vehicle, and a controller. The controller includes one or more processors that may obtain an operational parameter, and communicate the signal based on the operational parameter when the first power source supplies power to the communication system. The one or more processors may communicate the signal utilizing the power from the second power source based on the operational parameter when the first power source does not supply power to the communication system.

Optionally, the controller may determine the first power source may be unable to supply the power to communicate the signal to the second vehicle, and communicate the signal utilizing power from the second power source in response to obtaining the operational parameter and determining the first power source may be unable to supply the power to communicate the signal. In one aspect the vehicle system may be an autonomous vehicle system, referring to a vehicle system that is configured, in at least one mode of operation, to operate for movement along a route without any onboard human operators. In another aspect, the controller may obtain a second operational parameter from an input of the controller, and communicate the signal utilizing power from the second power source in response to obtaining the second operational parameter. In one example, the first vehicle may be a head of a rail vehicle system, and the second vehicle may be an end of the rail vehicle system. In another example, the first power source and the second power source are disposed within a head of a rail vehicle system.

A suitable first power source may an engine, fuel cell, fly wheel, battery, hybrid device, pneumatic device, or hydraulic device. A suitable second power source may be a capacitor, super capacitor, or battery. A hybrid device may be any device that generates power based in part on battery and in part on a combustion engine. Whereas pneumatic devices and hydraulic devices are high powered devices that generate power from a pneumatic source or a hydraulic source, including hydrostatic engines. In one aspect, to obtain the operational parameter the one or more processors may receive a signal from a sensor, or receive an input from an operator. In another aspect, the first power source is not coupled to the second power source. In one example, the system may include a sensor coupled to the vehicle system and can obtain the operational parameter.

In some example embodiments, a system may include a vehicle system having a first power source and a second power source. The second power source may supply power to communicate a signal from first vehicle to the second vehicle. The system may include a sensor coupled to an operating system of the vehicle system and may obtain an operational parameter related to the operation of the vehicle system. The system may include a controller. The controller may include one or more processors that may obtain the operational parameter from the sensor, determine an operating condition of the first power source, and communicate the signal utilizing the power from the second power source based on the operational parameter and the operating condition of the first power source.

Optionally, the operating condition of the first power source may be that the first power source may be unable to supply power. In one aspect, the controller may obtain a second operational parameter from at least one of a manual input, or a second sensor. In another aspect, the operating condition of the first power source may be determined based on the second operational parameter.

In some example embodiments, a system may include a vehicle system having a first power source and a second power source. The system may include a sensor that can be coupled to the first power source to receive power for operation, and coupled to the second power source to receive power for operation. The sensor may be coupled to a braking system to obtain an operational parameter related to the braking system. The system may have a controller. The controller may include one or more processors that may determine the first power source may be unable to provide power for operation to the sensor, and operate the sensor with the power from the second power source in response to determining the first power source may be unable to provide power for operation to the sensor.

Optionally, the controller may communicate a signal from a first vehicle of the vehicle system to a second vehicle of the vehicle system based on the operational parameter obtained from the sensor when the sensor may be operated using the power from the second power source. In one aspect, the first vehicle may be a head vehicle of a rail vehicle system and the second vehicle may be an end vehicle of the rail vehicle. In another aspect, the first power source may be disposed on the head vehicle, and the second power source may be coupled to the first power source and disposed on the head of the vehicle. In one example, the one or more processors may monitor the second power source to determine a health condition of the second power source.

In some example embodiments, the device performs one or more processes described herein. In some example embodiments, the device performs these processes based on processor executing software instructions stored by a computer-readable medium, such as a memory and/or a storage component. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into a memory and/or a storage component from another computer-readable medium or from another device via the communication interface. When executed, software instructions stored in a memory and/or a storage component cause the processor to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a first power source configured to supply power to a first communication system of a vehicle system to communicate a signal from a first vehicle of the vehicle system to a second vehicle of the vehicle system;
a second power source configured to supply power to a second communication system to communicate the signal from the first vehicle to the second vehicle; and
a controller including one or more processors configured to:
communicate the signal based on an operational parameter when the first power source supplies power to the communication system; and
communicate the signal utilizing the power from the second power source based at least in part on the operational parameter when the first power source does not supply power to the communication system,
wherein the operational parameter comprises a parameter related to at least one of a pressure sensor, a temperature sensor, a pneumatic sensor, a hydraulic sensor, an optic sensor, an accelerometer, a vibration sensor, a haptic sensor, or a fluid level sensor.

2. The system of claim 1, wherein the controller is further configured to determine the first power source is unable to supply the power to communicate the signal to the second vehicle; and
communicate the signal utilizing power from the second power source in response to obtaining the operational parameter and determining the first power source is unable to supply the power to communicate the signal.

3. The system of claim 1, wherein the operational signal indicates a determined event has occurred, and the controller responds by switching modes to communicate the signal from the first communication system to the second communication system.

4. The system of claim 1, wherein the controller is further configured to obtain a second operational parameter from an input of the controller, and communicate the signal utilizing power from the second power source in response to obtaining the second operational parameter.

5. The system of claim 1, wherein the vehicle system is a rail vehicle system, the first vehicle is a head of the rail vehicle system, and the second vehicle is an end of the rail vehicle system.

6. The system of claim 1, wherein the vehicle system is a rail vehicle system, and the first power source and the second power source are disposed within a head of the rail vehicle system.

7. The system of claim 1, wherein the first power source is one of an engine, a first battery, a fuel cell, a hybrid device, a pneumatic device, or a hydraulic device, and the second power source is one of a capacitor, super capacitor, or a second battery.

8. The system of claim 1, wherein to obtain the operational parameter the one or more processors are configured to at least one of receive a signal from a sensor and to receive an input from an operator.

9. The system of claim 1, wherein the first power source is not electrically coupled to the second power source.

10. The system of claim 1, further comprising a sensor coupled to the vehicle system and configured to obtain the operational parameter, and the sensor is a pneumatic sensor, and the operational parameter is a brake pressure.

11. The system of claim 1, wherein the vehicle system is an autonomous vehicle system.

12. A vehicle system comprising:
a first power source and a second power source;
a sensor coupled to an operating system of the vehicle system and configured to obtain an operational parameter related to the operation of the vehicle system;
the second power source configured to supply power to communicate a signal from a first vehicle controller to a second vehicle controller, and supply power to the sensor; and
the first vehicle controller including one or more processors that are configured to communicate the signal based at least in part on the operational parameter, wherein the operational parameter comprises a parameter related to at least one of a pressure sensor, a temperature sensor, a pneumatic sensor, a hydraulic sensor, an optic sensor, an accelerometer, a vibration sensor, a haptic sensor, or a fluid level sensor.

13. The system of claim 12, wherein the operational parameter is a pneumatic parameter.

14. The system of claim 12, wherein the first vehicle controller is further configured to obtain a second operational parameter from at least one of a manual input, or a second sensor.

15. The system of claim 14, wherein the operating condition of the first power source is determined based on the second operational parameter.

16. A system comprising:
a controller configured to operate a communication unit, receive a sensor signal from a sensor onboard a vehicle system, and communicate the sensor signal by selectively using power from a first or a second power source responsive to the sensor signal meeting one or more designated criteria,
wherein the sensor comprises at least one of a pressure sensor, a temperature sensor, a pneumatic sensor, a hydraulic sensor, an optic sensor, an accelerometer, a vibration sensor, a haptic sensor, or a fluid level sensor.

17. The system of claim 16, wherein the vehicle system is a rail vehicle system, and the controller is one of a head of train controller or an end of train controller.

18. The system of claim 17, further comprising the first power source that is disposed on a head vehicle, and the second power source that is both coupled to the first power source and disposed on the head vehicle.

19. The system of claim 18, wherein the controller is further configured to monitor the second power source to determine a health condition or state of charge of the second power source.

20. The system of claim 16, wherein the one or more designated criteria comprises a pneumatic parameter.

* * * * *